United States Patent [19]

Hafele

[11] 4,156,529

[45] May 29, 1979

[54] STUFFING BOX SEAL FOR FITTINGS

[76] Inventor: Carl H. Hafele, Bergstrasse 83, 4050 Monchen-Gladbach, Fed. Rep. of Germany

[21] Appl. No.: 877,911

[22] Filed: Feb. 15, 1978

[30] Foreign Application Priority Data

Feb. 16, 1977 [DE] Fed. Rep. of Germany ....... 2706487

[51] Int. Cl.² ...................... F16J 15/00; F16K 41/02; F16K 25/04
[52] U.S. Cl. .................................. 277/105; 277/125; 277/233; 277/237 R; 285/378; 285/422; 251/214; 115/74
[58] Field of Search .......................... 114/222; 115/74; 277/105, 125, 237 R, 233, 234; 285/173, 329, 378, 422; 137/375; 251/214, 368

[56] References Cited

U.S. PATENT DOCUMENTS

| 894,791 | 7/1908 | Barnett | 277/125 |
|---|---|---|---|
| 1,483,631 | 2/1924 | Forbes | 277/105 X |
| 1,572,922 | 2/1926 | Jovers et al. | 277/105 X |
| 1,646,735 | 10/1927 | Mills | 285/422 X |
| 1,925,268 | 9/1933 | Mellor | 277/125 X |
| 2,240,021 | 4/1941 | Rutherford | 285/422 X |
| 2,299,813 | 10/1942 | Franks | 277/237 X |
| 3,620,943 | 11/1971 | White | 114/222 X |
| 3,761,055 | 9/1973 | Ebuchi et al. | 277/125 X |

FOREIGN PATENT DOCUMENTS

| 962293 | 2/1975 | Canada | 277/105 |
|---|---|---|---|
| 1774 of | 1892 | United Kingdom | 277/105 |
| 186529 | 10/1922 | United Kingdom | 285/378 |

OTHER PUBLICATIONS

*Mechanical Engineers' Handbook*, (McGraw-Hill Book Co., Inc., New York), 1958, 6th Ed., Baumeister, et al., Editors, pp. 6-122 and 6-123.

*Primary Examiner*—Robert S. Ward, Jr.
*Attorney, Agent, or Firm*—Thomas H. Murray; Clifford A. Poff

[57] ABSTRACT

The stuffing box chamber in a fitting, particularly a valve, contains a deformable stuffing box seal. The seal includes conventional sealing material and a constituent material such as zinc or aluminum having a standard potential that is less positive in the electrochemical potential series than the potential of the material defining the stuffing box chamber, i.e., the constituent material is less precious. Dust, granules or filaments of less precious material are mixed with the standard sealing material. Another embodiment includes alternating layers of discs made from the conventional and less precious materials. A further embodiment provides that the less precious material is an envelope or coating surrounding the conventional sealing material.

10 Claims, 2 Drawing Figures

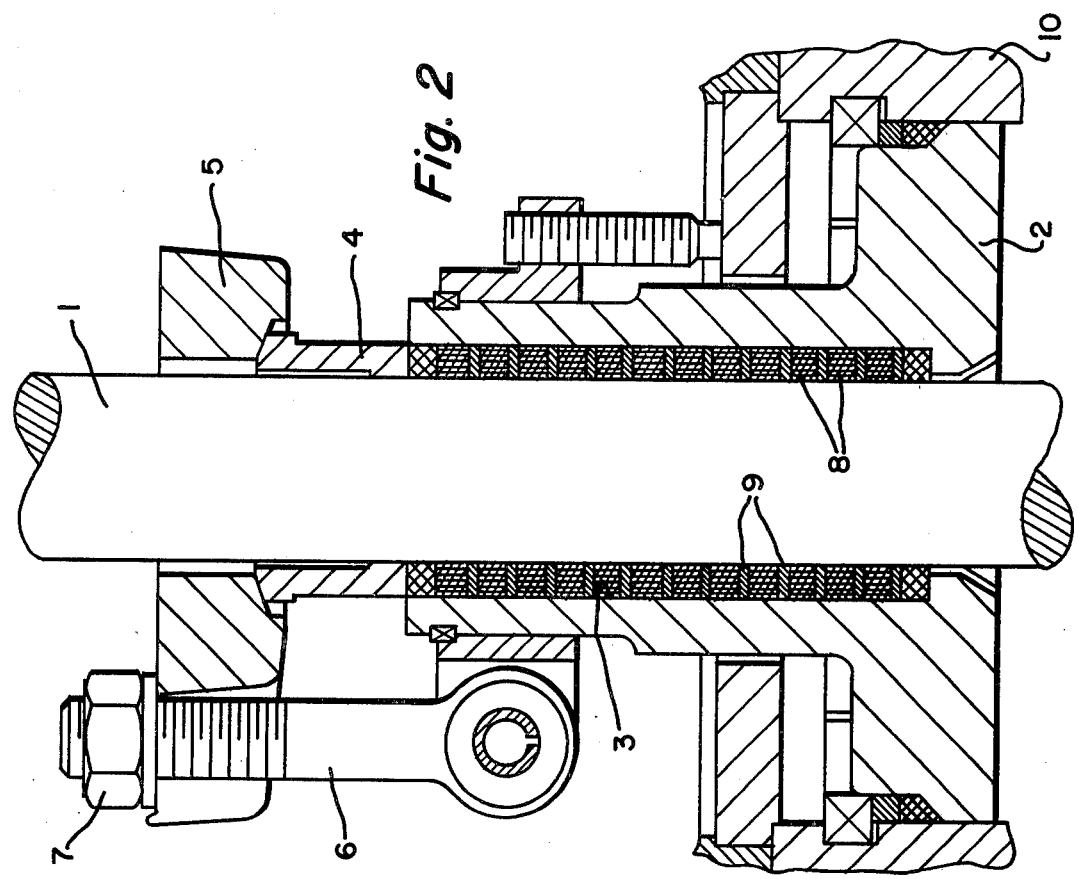
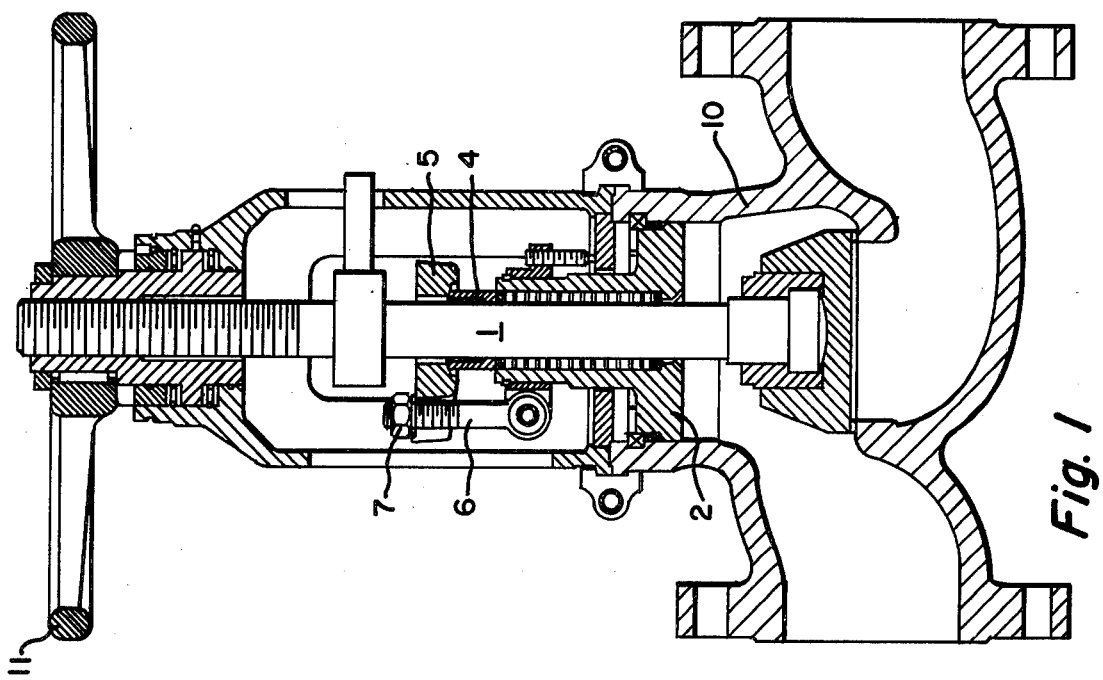

STUFFING BOX SEAL FOR FITTINGS

BACKGROUND OF THE INVENTION

The invention relates to a stuffing box seal for fittings, more particularly for valves or the like, in which deformable sealing material is contained in the stuffing box chamber between a casing wall and another component, for example a spindle.

The lid member situated in the fluid-biased chamber of stop valves is connected by means of a spindle to the outer drive. A bushing through which the rotatably and/or axially movable spindle extends through the casing chamber is sealed by means of a stuffing box seal. In a stuffing box seal of this kind deformable material, exposed to the pressure of a gland device, is situated in the stuffing box chamber in order to prevent or reduce to a minimum any leakages.

Asbestos is predominantly used as sealing material in stuffing box seals of this kind, particularly when the seals are exposed to elevated temperatures. Special substances, such as graphite, are added to the asbestos to improve its anti-friction properties. It is also known to use pure carbon as a sealing material for particularly difficult sealing problems.

In the stuffing box chamber, the contact surfaces between the casing and the spindle form local elements with the sealing material and its admixtures in the presence of an electrolyte. These contact surfaces are therefore subject to attack due to corrosion and can be prematurely destroyed.

SUMMARY OF THE INVENTION

It is an object of the present invention to provide an improved stuffing box seal in which there is no risk of electrochemical corrosion at the contact surfaces of the casing and spindle or there is at least a substantially less risk of such corrosion as compared with known stuffing box seals.

According to the present invention, there is provided a stuffing box in combination with a fitting such as a valve having a stuffing box chamber extending between a casing wall and a fitting element, the stuffing box seal includes deformable sealing material and a constituent material with a standard potential defined as less positive in the electrochemical potential series as compared with the electrochemical potential of the material defining the casing wall and the material defining the fitting element, the constituent material of the sealing material being less precious material than the material of the casing wall and the fitting element.

Thus, the present invention provides a stuffing box seal for fittings of the kind described hereinbefore wherein the problem of electrochemical corrosion is solved in accordance with the invention by providing that the stuffing box chamber contains, in addition to a conventional sealing material, a constituent material which has a standard potential that is less positive in the electrochemical potential series when compared with the material of the casing or the spindle, i.e., the constituent material is a less precious material than the material of the casing or spindle.

According to one particular embodiment of the invention, the less precious material is mixed in the form of small particles, such as dust, granules or filaments, with conventional sealing material.

The intended result achieved according to the present invention is also achieved according to another embodiment of the invention by providing that the stuffing box packing or seal in the stuffing box chamber comprises layers of conventional sealing material on the one hand and a less precious material on the other hand, the layers following each other alternately in the axial direction along the spindles. Annular discs corresponding to the dimensions of the stuffing box chamber can be used for the layers of less precious material.

According to another embodiment of the invention, metals, more particularly zinc or aluminum, are used as less precious material.

The invention utilizes the different characteristics of the elements in accordance with their position in the electrochemical potential series. According to this position, the tendency of the metals to change into the ionized state increases if the standard potential becomes more negative, i.e., the reaction and therefore electrochemical corrosion which takes place on the less precious materials is greater than that which takes place on the more precious materials. According to the invention, admixing of a material such as zinc or aluminum which is less precious than that of the fittings or spindle materials in a simple way transfers the electrochemical corrosion from the casing or spindle surface to the admixed, less precious material.

If a coating of less precious material is present only on the wall of the stuffing box chamber, according to one embodiment of the invention, only the spindle will be protected against electrochemical corrosion but this is a substantial advantage as compared with the normal stuffing box seals because corrosion on the casing seal surface is far less problematical than corrosion on the spindle surface as regards the sealing-tightness of a fitting.

The above and other objects and features of the invention will become apparent from the following detailed description taken in connection with the accompanying drawings which form a part of this specification, and in which:

FIG. 1 is an elevational view in section of a valve embodying the features of the present invention, and FIG. 2 is an enlarged view of the stuffing box seal shown in FIG. 1.

FIGS. 1 and 2 illustrate a valve having a handwheel 11 secured to the upper end of a spindle 1. The spindle extends through an annular stuffing box chamber 3. Chamber 3 is normally filled with deformable sealing material which can be compressed by means of a compression sleeve 4 that acts on the outer end of the stuffing box chamber. The stuffing box chamber is situated between a spindle 1 and the casing 2. As shown in FIG. 2, the casing 2 is a ring fitted into the body or case 10 of the valve. The upper surface of the compression sleeve 4 is contacted by a gland 5 which is generally acted upon by two screw-threaded bolts 6, only one of which is shown. The lower end of bolts 6 are pivotably supported on the fitting casing 2. Tightening of the nuts 7 applies the necessary thrust for compressing the sealing material to the stuffing box chamber 3.

The illustrated embodiment of the stuffing box packing or seal comprises layers of conventional sealing material 8 on the one hand and a less precious material 9 on the other hand. The layers 8 and 9 follow each other alternately in the axial direction of the spindle 1. The layers of less precious material comprise individual annular discs 9 which are inserted alternately between the layers of conventional sealing material 8. As described hereinabove, the less precious material consists of, for example, zinc or aluminum. The material may be finely divided into particles, granules or filaments. These forms of the less precious material may be admixed with the conventional stuffing box materials or pressed into individual discs for an alternating arrangement with discs 8.

Other embodiments of the present invention include the use of such less precious materials to form an envelope surrounding the conventional sealing material within the stuffing box. If desired, of course, the outer envelope may be a coating upon the casing wall within the stuffing box.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A stuffing box seal in combination with a fitting such as a valve having a stuffing box chamber extending between a casing wall and a fitting element, said stuffing box containing a stuffing box seal which includes deformable sealing material and a constituent material with a standard potential defined as less positive in the electrochemical potential series as compared with the electrochemical potential of the material defining said casing wall and the material defining said fitting element to transfer electrochemical corrosion therefrom to said stuffing box seal, said constituent material of the sealing material being less precious material than the material of said casing wall and said fitting element.

2. The stuffing box seal according to claim 1 wherein said constituent material includes finely divided particles of said less precious material mixed with said deformable material.

3. The stuffing box seal according to claim 1 wherein said constituent material includes granules of said less precious material mixed with said deformable material.

4. The stuffing box seal accordong to claim 1 wherein said constituent material includes filaments of said less precious material mixed with said deformable material.

5. The stuffing box seal according to claim 1 wherein discrete layers of said deformable sealing material follow alternatlely in an axial direction of said fitting element with discrete layers of said less precious material.

6. The stuffing box seal according to claim 5 wherein the discrete layers of said less precious material consist of annular discs.

7. The stuffing box seal according to claim 1 wherein said less precious material defines an envelope surrounding said deformable sealing material.

8. The stuffing box seal according to claim 1 wherein said less precious material defines an outer envelope coating upon said casing wall within said stuffing box.

9. The stuffing box seal according to claim 1 wherein said less precious material is zinc.

10. The stuffing box seal according to claim 1 wherein said less precious material is aluminum.

* * * * *